United States Patent [19]

Santangelo et al.

[11] Patent Number: 4,633,929
[45] Date of Patent: Jan. 6, 1987

[54] METHOD FOR PRODUCING METAL CASTINGS

[75] Inventors: Joseph G. Santangelo; James J. Weber, both of Allentown, Pa.; Richard G. Sinclair; Richard D. Tenaglia, both of Columbus, Ohio

[73] Assignee: Air Products and Chemicals, Inc., Allentown, Pa.

[21] Appl. No.: 787,859

[22] Filed: Oct. 16, 1985

[51] Int. Cl.⁴ .......................... B22C 9/04; B22C 7/02
[52] U.S. Cl. ..................................... 164/34; 164/45; 164/246; 521/189
[58] Field of Search ................... 164/34, 45, 246, 516; 521/189

[56]  References Cited
U.S. PATENT DOCUMENTS

| 3,248,415 | 4/1966 | Stevens | 502/172 |
| 3,351,123 | 11/1967 | Payne | 164/34 |
| 3,585,168 | 6/1971 | Inoue | 260/77.5 D |
| 3,942,583 | 3/1976 | Baur | 164/246 |
| 3,953,383 | 4/1976 | Inoue et al. | 260/2 |

Primary Examiner—Nicholas P. Godici
Assistant Examiner—Samuel M. Heinrich
Attorney, Agent, or Firm—Mark L. Rodgers; E. Eugene Innis; James C. Simmons

[57] ABSTRACT

Metal castings having reduced residual carbon ash and surface flaws are produced by an evaporative pattern casting process, in which an organic foam pattern is vaporized upon contact with a molten metal leaving a metal replica of the pattern. The organic foam used in this process comprises a polymer formed by polymerizing $CO_2$ with one or more oxirane compounds.

18 Claims, No Drawings

METHOD FOR PRODUCING METAL CASTINGS

TECHNICAL FIELD OF THE INVENTION

The present invention relates to a method for producing metal castings by an evaporative pattern casting process.

BACKGROUND OF THE INVENTION

Various processes have been developed for casting metals using a destructable pattern made of material that vaporizes on contact with molten metal when poured into a mold containing the destructable pattern. Such processes, typically referred to as "Evaporative Pattern Casting" processes, commonly use expandable polystyrene beads which are formed into the desired foundry patterns. Molten metal, such as iron or steel poured into a mold containing sand surrounding the polystyrene pattern, causes the pattern to vaporize, resulting in a metal replica of the pattern in the sand. Upon decomposition of the polystyrene, however, a significant amount of carbonaceous residue is formed on the surface of the metal casting. This residue, thought to be pyrolytic carbon, interferes with the quality of the metal casting making this process unattractive for operations where high quality castings are desired.

Attempts have been made to replace the polystyrene foam with foams made from phenolic-urethane and urea formaldehyde polymers. These compounds require very high temperatures for decomposition and, like the polystyrene, produce carbonaceous residues upon decomposition. An extensive ventilation system is also required when using these type of foams because of the large quantities of toxic gases generated upon vaporization.

U.S. Pat. No. 3,351,123 discloses an evaporative pattern casting process and a mold for use in such a process. The mold comprises a foamed thermoplastic synthetic resin having a refractory coating consisting of a particulate refractory filler bonded together with a silicon-containing binding agent. The thermoplastic synthetic resins which are disclosed for use in this operation include: cellulose ethers and esters, olefins, vinyl esters of carboxylic acids, vinyl ethers, unsaturated carboxylic acids and derivatives thereof, methacrylic acid esters of alcohols containing 1–18 carbon atoms, vinyl aromatic compounds such as styrene, and polymers of monomeric compounds containing the vinylidene grouping $CH_2=C<$.

U.S. Pat. No. 3,942,583 discloses using plastic patterns for metal casting molds which are built up from plastic plate or sheet material bonded to an internal supporting frame. The plastic material is comprised of foam plastic, such as foams of polyurethane, phenol resin, polystyrene, cellulose acetate, polyvinylchloride, polyethylene or vinylacetate. Alternatively, the material can also be a solid plastic such as polyethylene.

BRIEF SUMMARY OF THE INVENTION

The present invention is a method for reducing residual carbon ash and surface flaws on metal castings produced by an evaporative pattern casting process in which an organic foam is shaped into a particular pattern to be reproduced by a molten metal. The organic foam pattern is embedded in a support medium and subsequently contacted with molten metal such that the organic foam vaporizes leaving a metal replica of the foam pattern in the support medium. Significant reductions in carbon ash deposits and surface flaws on the metal castings are achieved by using an organic foam comprising a polymer formed by polymerizing $CO_2$ with one or more oxirane compounds. The oxirane compounds used in the polymerization have the general structural formula:

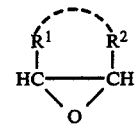

wherein $R_1$ is H, $CH_3$, $C_2H_5$, $C_3H_7$, $C_4H_9$, $C_6H_5$ or $C_6H_{11}$, and $R_2$ is H or $CH_3$. Additionally, $R_1$ and $R_2$ together may form a six member ring.

The polymerization reaction of $CO_2$ with the oxirane compounds results in a polymer having covalently linked alkylene carbonate units. The resulting polyalkylene carbonate polymer is foamed and shaped into the desired pattern to be reproduced with the metal casting.

DETAILED DESCRIPTION OF THE INVENTION

The present invention is a method for reducing residual carbon ash and surface flaws on metal castings produced by an evaporative casting process. In such a process, an organic foam is shaped into a particular pattern and embedded in a support medium. The foam pattern is subsequently contacted with molten metal which causes the foam to vaporize leaving a metal replica of the pattern in the support medium. It has now been found that superior quality metal castings can be produced by such a process by using an organic foam comprising a polymer formed by polymerizing $CO_2$ with one or more oxirane compounds.

The oxirane compounds which can be polymerized with $CO_2$ to produce a suitable molding material have the general structural formula:

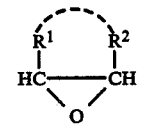

wherein $R_1$ is selected from the group consisting of H, $CH_3$, $C_2H_5$, $C_3H_7$, $C_4H_9$, $C_6H_5$ and $C_6H_{11}$; $R_2$ is selected from the group consisting of H and $CH_3$; or $R_1$ and $R_2$ together form a six-member ring.

While any oxirane compounds having the above structure can be used to form the desired polymer, it is preferred to use a 1,2 monoepoxide; i.e., $R_2$ is H. In many instances, it may be still further preferred to use ethylene or propylene oxide; i.e., $R_1$ is H or $CH_3$ and $R_2$ is H, as the oxirane compound.

The oxirane compound, or compounds, are polymerized with $CO_2$ by any conventional polymerization method, such as the method disclosed by Shohei Inoue in U.S. Pat. Nos. 3,585,168 and 3,953,383. The resulting polymer is a polyalkylene carbonate having covalently linked units of the general structural formula:

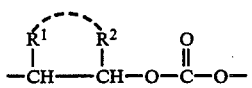

wherein $R_1$ is selected from the group consisting of H, $CH_3$, $C_2H_5$, $C_3H_7$, $C_4H_9$, $C_6H_5$ and $C_6H_{11}$; $R_2$ is selected from the group consisting of H and $CH_3$; or $R_1$ and $R_2$ together form a six-member ring.

The polyalkylene carbonate polymer can be made up of identical repeating units or of two or more different units having the above structure, either randomly or sequentially arranged. The polymer can be compounded with a wide variety of polymer additives to alter the physical and/or chemical properties of the polymer. Typical polymer additives include ultra-violet resistant agents, heat stability agents, slip agents, cross-linking agents, etc. Preferably, the polymer should have a molecular weight of at least 5,000 to insure that it is sufficiently rigid to be easily handled and used in the present process. Polymers having molecular weights of up to and even greater than 2,000,000 are possible depending upon the synthesis technique and equipment.

Once the polyalkylene carbonate polymer is synthesized, it is subsequently formed into a foam. Any appropriate foaming process which is capable of foaming the polymer can be used: such as a freeze-drying foaming process. In some instances, foaming may be accomplished by impregnating the polymer with various blowing agents. Such blowing agents include the vaporized form of normally liquid hydrocarbons including petroleum ether, pentane, hexane, heptane, cyclopentane, cyclohexane, cyclopentadiene or mixtures thereof. The polymer should be foamed to a density between about 0.01–0.9 g/cc, with a density between 0.02–0.05 g/cc being preferred. The resulting foam polymer should have a glass transition temperature of at least 20° C., with above 30° C. being preferred, and can theoretically be as high as the temperature at which the molten metal is poured.

The polymer can be shaped into the desired casting pattern directly during the foaming process, or prior foamed polymer can subsequently be shaped into the pattern. Additionally, it may be possible to have the polymer expand and foam upon injection into a preformed mold or space within a support medium.

The foamed polyalkylene carbonate pattern is optionally coated with a refractory coating, such as a silica/water-based slurry, and is embedded in a support medium. Loose, unbonded sand is one such support medium, although other granular solids which are inert and do not interact with the castings can be used. Any molten metal suitable for casting, such as grey iron or steel, upon contacting the foam, causes the foam to vaporize leaving a metal replica of the foam pattern in the support medium.

Using an organic foam having the above-described composition in an evaporative pattern casting process has many advantages over prior processes. Analysis of the thermal decomposition of this class of polymer indicates a sharp decomposition into mainly $CO_2$ and $H_2O$ products with almost no trace of residual ash. This results in few, if any, surface flaws on the metal castings which are prevalent on metal castings made by using polystyrenes or polyurethane or similar organic foams. In addition to being "clean-burning", the present foams do not give off excessive volumes of toxic fumes, as do foams made from phenolic-urethane or urea-formaldehyde. The polyalkylene carbonate foams in many cases have a higher abrasion resistance and are tougher than typical polystyrene foams, thereby being able to form less fragile patterns.

The following examples describe specific embodiments of the present invention and are not meant to limit the scope of the invention.

EXAMPLE 1

Propylene oxide was polymerized with $CO_2$ in an organic solvent in accordance with the general procedures set out in U.S. Pat. No. 3,953,383, to produce a polypropylene carbonate polymer. The polymer was separated from solution, washed and subsequently foamed in an Erlenmeyer flask using a conventional freeze-drying method. The resulting polypropylene carbonate foam had a density of about 0.03 g/cc.

A sample of the polypropylene carbonate foam and a sample of conventional polystyrene foam, to be used as casting molds, were dipped in a silica/water-based slurry refractory coating, and allowed to air dry for about 18 hours at ambient temperature. Some penetration of the refractory coating into both foams were observed. The coated foam samples were then attached with a hot melt adhesive to opposite ends of a runner bar made of polystyrene. A polystyrene downsprue was attached to the center of the runner bar, thereby forming a "T" bar.

The "T" bar containing the two foam samples was placed in an Evaporative Pattern Casting flask positioned on a compaction table. Loose, unbonded sand was placed in the flask to cover the foam samples, runner bar and all but the top of the downsprue. The flask was vibrated on the compaction table at 4,000 rpm for 10 seconds to settle the sand securely around the foam samples. A ceramic pouring cup was positioned around the top of the downsprue which protruded through the top of the sand to allow for easy pouring of the molten metal. A weighted ring was placed on top of the ceramic pouring cup, and additional weights were placed on top of the sand bed to prevent fluidization of the sand when the molten metal was poured. Additionally, a vacuum assist pump was set up to remove gases from the flask to further help prevent fluidization of the sand during pouring.

Molten grey iron at about 2,600° F. was poured into the ceramic pouring cup. The molten iron traveled down along the polystyrene downsprue and along the polystyrene runner bar to the foam samples. Upon contact with the molten iron, the downsprue, runner bar and foam samples vaporized, and the space they occupied within the sand was replicated with the molten metal. The castings were allowed to cool for about 15 minutes in the flask. When the samples were removed, excess refractory coating was removed and the surfaces of both samples were examined qualitatively.

A visual comparison of the two cast metal samples showed extensive carbonaceous deposits and flaws on the surface of the sample which was cast using the polystyrene mold. The metal casting which was cast using the polypropylene carbonate mold showed little or no surface flaws or wrinkling caused by carbonaceous deposits. The metal cast from the polypropylene carbonate mold, in general, showed a more uniform and smoother surface than did the metal casting from the polystyrene mold.

To verify the results of this experiment, a subsequent run was made using the same conditions and process steps set out above. As in the first experiment, the metal casting made using the polystyrene mold showed extensive surface flaws, whereas the metal casting made using the polypropylene carbonate mold had a more uniform surface with no visual evidence of surface flaws caused by carbonaceous deposits.

EXAMPLE 2

Ethylene oxide is polymerized with $CO_2$ in accordance with the general procedures set out in U.S. Pat. No. 3,953,383, to produce a polyethylene carbonate polymer. The polymer is separated from solution, washed and foamed in accordance with conventional foaming techniques to a density of about 0.03 g/cc. The foamed polyethylene carbonate polymer is subsequently coated with a silica/water-based refractory coating, and air dried for about 18 hours at ambient temperature. The dried polyethylene carbonate foam is then used as a destructive mold pattern in the casting procedure described above.

Having thus described the present invention, what is now deemed appropriate for letters patent is set out in the following appended claims.

What is claimed is:

1. A method for reducing residual carbon ash and surface flaws on metal castings produced by an evaporative pattern casting process in which an organic foam is shaped into a particular pattern to be reproduced by molten metal, said foam pattern being embedded in a support medium, whereby when said foam is subsequently contacted with molten metal whereby the organic foam vaporizes leaving a metal replica of the foam pattern in the support medium, said method comprising: using an organic foam comprising a polymer formed by polymerizing $CO_2$ with one or more oxirane compounds.

2. The method in accordance with claim 1 wherein said oxirane compounds are selected from the group consisting of ethylene oxide and propylene oxide and mixtures thereof.

3. The method in accordance with claim 1 wherein said polymer has a molecular weight of at least 5,000.

4. The method in accordance with claim 1 wherein said organic foam has a glass transition temperature of at least 20° C.

5. The method in accordance with claim 1 wherein said organic foam has a density between 0.01–0.9 g/cc.

6. The method in accordance with claim 1 wherein said organic foam is synthesized from said polymer by a freeze-drying foaming method.

7. The method in accordance with claim 1 wherein said support medium is loose, unbonded sand.

8. The method in accordance with claim 1 wherein said molten metal is grey iron.

9. A method for reducing residual carbon ash and surface flaws on metal castings produced by an evaporative pattern casting process in which an organic foam is shaped into a particular pattern to be reproduced by molten metal, said foam pattern being embedded in a support medium, whereby when said foam is subsequently contacted with molten metal, the organic form vaporizes leaving a metal replica of the foam pattern in the support medium, said method comprising:
using an organic foam comprising a polymer formed by polymerizing $CO_2$ and one or more oxirane compounds having the general formula:

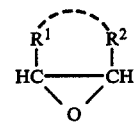

wherein $R_1$ is selected from the group consisting of H, $CH_3$, $C_2H_5$, $C_3H_7$, $C_4H_9$, $C_6H_5$ and $C_6H_{11}$; $R_2$ is selected from the group consisting of H and $CH_3$; or $R_1$ and $R_2$ together form a six-member ring.

10. The method in accordance with claim 9 wherein $R_2$ is H.

11. The method in accordance with claim 10 wherein $R_1$ is selected from the group consisting of H and $CH_3$.

12. The method in accordance with claim 9 wherein said polymer has a molecular weight of at least 5,000.

13. The method in accordance with claim 9 wherein said organic foam has a density between 0.02–0.05 g/cc.

14. A method for reducing residual carbon ash and surface flaws on metal castings produced by an evaporative pattern casting process in which an organic foam is shaped into a particular pattern to be reproduced by molten metal, said foam pattern being embedded in a support medium, whereby when said foam is subsequently contacted with molten metal, the organic foam vaporizes leaving a metal replica of the foam pattern in the support medium, said method comprising:
using an organic foam comprising a polymer having covalently linked
units of the general structural formula:

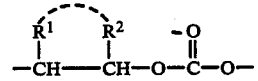

wherein $R_1$ is selected from the group consisting of H, $CH_3$, $C_2H_5$, $C_3H_7$, $C_4H_9$, $C_6H_5$ and $C_6H_{11}$; $R_2$ is selected from the group consisting of H and $CH_3$; or $R_1$ and $R_2$ together form a six-member ring.

15. The method in accordance with claim 14 wherein $R_2$ is H.

16. The method in accordance with claim 15 wherein $R_1$ is selected from the group consisting of H and $CH_3$.

17. The method in accordance with claim 14 wherein said polymer has a molecular weight of at least 5,000.

18. The method in accordance with claim 14 wherein said organic foam has a density between 0.02–0.05 g/cc.

* * * * *